United States Patent
Conner

(10) Patent No.: US 6,644,849 B1
(45) Date of Patent: Nov. 11, 2003

(54) LOW PRECISION TEMPERATURE SENSOR FOR AIRCRAFT APPLICATIONS

(75) Inventor: Kevin J Conner, Kent, WA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/585,917

(22) Filed: Jun. 2, 2000

Related U.S. Application Data

(60) Provisional application No. 60/154,895, filed on Sep. 20, 1999.

(51) Int. Cl.$^7$ .......................... G01K 1/16; G01K 17/06
(52) U.S. Cl. ...................... 374/141; 374/183; 374/109; 374/44
(58) Field of Search ................. 374/183, 185, 374/141, 120, 109, 134, 136, 189, 43–44, 208

(56) References Cited

U.S. PATENT DOCUMENTS

| | | | | |
|---|---|---|---|---|
| 2,282,441 A | * | 5/1942 | Whitlock | |
| 3,750,465 A | * | 8/1973 | Howell et al. | 73/117.3 |
| 4,182,182 A | * | 1/1980 | Stortz | 73/343 R |
| 4,263,804 A | * | 4/1981 | Seemann | |
| 4,325,123 A | * | 4/1982 | Graham et al. | 364/431.07 |
| 4,401,104 A | * | 8/1983 | Kuzdrall | 126/419 |
| 4,483,614 A | * | 11/1984 | Rogers | 356/28.5 |
| 4,591,111 A | * | 5/1986 | Laughter | 244/75 R |
| 4,787,053 A | * | 11/1988 | Moore | 364/551.01 |
| 4,791,076 A | * | 12/1988 | Leggett et al. | 501/95 |
| 4,861,653 A | * | 8/1989 | Parrish | 428/288 |
| 4,965,572 A | * | 10/1990 | Adamson | 340/968 |
| 5,026,748 A | * | 6/1991 | Adams et al. | 524/66 |
| 5,276,326 A | * | 1/1994 | Philpott | 250/334 |
| 5,304,003 A | * | 4/1994 | Winninger | 374/150 |
| 5,488,375 A | * | 1/1996 | Michie | 342/26 |
| 5,490,895 A | * | 2/1996 | Wang et al. | 156/286 |
| 5,997,927 A | * | 12/1999 | Gics | 426/383 |
| 6,012,515 A | * | 1/2000 | Stubbendorff et al. | 165/257 |
| 6,169,496 B1 | * | 1/2001 | Martin et al. | 340/966 |
| 6,216,064 B1 | * | 4/2001 | Johnson et al. | 701/4 |
| 6,237,415 B1 | * | 5/2001 | Konno et al. | 73/504.16 |

FOREIGN PATENT DOCUMENTS

GB 262860 A * 5/1981

* cited by examiner

Primary Examiner—Christopher W. Fulton
Assistant Examiner—Gail Verbitsky
(74) Attorney, Agent, or Firm—Charles J. Rupnick

(57) ABSTRACT

A method and device for determining ambient air temperature by measuring the temperature of an aircraft interior skin surface.

4 Claims, 3 Drawing Sheets

LOW PRECISION TEMPERATURE SENSOR FOR AIRCRAFT APPLICATIONS

This application claims the benefit of U.S. Provisional Application Ser. No. 60/154,895, filed in the name of Kevin J. Conner on Sep. 20, 1999, the complete disclosure of which is incorporated herein by reference.

FIELD OF THE INVENTION

Ambient air temperature determination as a function of aircraft skin temperature.

BACKGROUND OF THE INVENTION

Many aircraft control functions require ambient air temperature information. Some of these applications require relatively accurate data. For example, U.S. Pat. No. 4,303,978, entitled Integrated-Strapdown-Air-Data Sensor System, issued to Shaw, et al on Dec. 1, 1981, the complete disclosure of which is incorporated herein by reference, discloses the use of raw air temperature signals, produced by total air temperature sensors, which are compensated and manipulated to produce signals suitable for use by the automatic flight control, pilot display, and navigation systems of the aircraft. Another, more recent example shown in FIG. 1, U.S. Pat. No. 5,276,326, entitled Scanning Ranging Radiometer for Weather Hazard Surveillance, issued to Philpott on Jan. 4, 1994, the complete disclosure of which is incorporated herein by ireference, discloses an in-flight windshear detection system which utilizes an externally mounted array of photoconductive infrared detectors 102 to detect the air temperature 104 in front of the aircraft 106 so as to provide a more accurate indication of windshear during approach. Placing air temperature sensors outside the skin of an aircraft requires piercing the airframe with one or more mounting and signal access holes to lead the signal back to the onboard equipment operating the application, for example, a central processing unit 108. The need of such applications for highly accurate ambient air temperature information justifies the holes in the airframe and the consequent structure analysis effort.

Furthermore, the skin temperature of high speed commercial aircraft, unlike that of slower single-engine piston aircraft, is not directly related to the ambient air temperature. Therefore, those applications on commercial aircraft requiring only approximate air temperature data are forced to use one of the conventional airframe-piercing thermal probes and suffer the consequential expense. Examples include the density altimeter disclosed in U.S. Pat. No. 4,263,804, entitled Apparatus for Directly Measuring Density Altitude in an Aircraft, issued to Seemann on Apr. 28, 1981, the complete disclosure of which is incorporated herein by reference, which uses the ambient air temperature, pressure and humidity conditions to determine density altitude. In another example, U.S. Pat. No. 4,325,123, entitled Economy Performance Data Avionic System, issued to Graham, et al on Apr. 13, 1982, the complete disclosure of which is incorporated herein by reference, an avionic system is disclosed for producing the most economical engine and airspeed settings as a function of multiple parameters, including outside air temperature at the departure airport, which is essentially aircraft skin temperature, even in larger commercial aircraft. Still another example is the thermal navigation device disclosed in U.S. Pat. No. 4,591,111, entitled Thermal Navigator, issued to Laughter on May 27, 1986, the complete disclosure of which is incorporated herein by reference, which uses temperature sensors mounted on the right and left aircraft wings to provide a temperature differential between the wings and indicate a rate of change in ambient air temperature, whereby an ultralight aircraft, glider, or sailplane detects thermal updrafts and indicates to the pilot when and how rapidly to turn to obtain the maximum lift from the thermal updraft. Such applications, although useful on any general aviation aircraft, except perhaps U.S. Pat. No. 4,591,111, have not been generally practical on smaller aircraft because neither the expenses for equipment and installation of conventional airframe-piercing thermal probes nor the concomitant structural analysis can be justified.

However, practice of these and similar applications on ultralight aircraft, gliders, sailplanes, and slower single-engine piston aircraft depends upon the availability of a low-cost thermal sensor that need not pierce the airframe to provide an adequate measure ambient air temperature.

Some applications on aircraft also benefit by the use of an outside air temperature signal. For example, a geometric altitude computation in an Enhanced Ground Proximity Warning System (EGPWS) is more accurate when the pressure altitude component is enhanced using approximate air temperature data. The usefulness of merely approximate air temperature data in such an applications makes piercing of the airframe similarly impractical.

Thermistors are one well-known generally low-cost thermal sensor. A thermistor as defined by Webster's New Collegiate Dictionary, 1977 edition, published by G.&C. Merriam Company, Springfield, Mass., is an electrical resistor making use of a semiconductor whose resistance varies sharply in a known manner with temperature. Conventional thermistor chips are shown in FIGS. 2A, 2B and described, for example, in U.S. Pat. No. 5,952,911, entitled Thermistor Chips and Methods of Making Same, issued to Kawase, et al on Sep. 14, 1999, the complete disclosure of which is incorporated herein by reference, as chips 110 formed of terminal electrodes 112 provided at both end parts of a thermistor element 114 having an oxide of a transition metal such as Mn, Co and Ni as its principal component. The terminal electrodes 112 are each formed of an end electrode 112A formed by applying Ag/Pd or the like in a paste form and then firing and a plating layer 112B formed on its surface by using Ni or Sn. The normal-temperature resistance value of such a thermistor chip is generally determined by the resistor value of the thermistor element 114 and the position of the terminal electrodes 112. As shown in FIG. 2C, U.S. Pat. No. 5,952,911 also discloses a more recent thermistor chip 116 wherein the terminal electrodes 118 are formed of a multi-layer structure having an inner most layer 118A in direct contact with a surface of the thermistor element 114 that affects its normal temperature resistance value.

However, thermistors have not been in use in aircraft industry for measuring ambient air temperature. Nor have either conventional thermal sensors or thermistors been used to measure skin temperature to determine ambient air temperature, without piercing the airframe. Therefore, a need exists to provide low precision ambient air temperature information in a form which avoids piercing the airframe skin and the concomitant structural analysis.

SUMMARY OF THE INVENTION

The present invention overcomes the limitations in the prior art of determining ambient air temperature using conventional thermal probes that pierce the airframe by providing a method for generating a signal representative of ambient air temperature surrounding an aircraft and supplying that signal to an avionics application by attaching a thermal sensor in contact with an interior surface of the skin of the aircraft, and with said thermal sensor, generating a signal as a function of ambient air temperature. According to one aspect of the invention, the thermal sensor is generally chosen from the class of thermal sensors known as thermistors.

According to other aspects of the invention, the thermistor is fixed in intimate thermal contact with the interior surface of the aircraft skin. Such intimate thermal contact is provided by installing a thermally conductive material between the thermistor and the interior skin surface. Preferably, the thermally conductive material is a thermally conductive bonding agent. The thermistor supplies the generated signal to one or more avionics applications capable of proper functioning using an imprecise indication of ambient air temperature.

According to still other aspects of the invention, the invention includes protecting the thermistor from an interior atmosphere of aircraft to reduce thermal effects resulting from contact with the usually warmer interior atmosphere. For example, the invention includes covering portions of the thermistor otherwise exposed to the interior atmosphere of the aircraft.

According to other aspects of the invention, the signal generated by the thermistor is directly correlated to ambient air temperature. However, the invention includes the option of conditioning the signal. According to one aspect of the invention, the signal is conditioned as a function of aircraft altitude, such as an applied offset that varies with altitude. According to an alternative aspect of the invention, the signal is conditioned using a constant offset.

According to still other aspects of the invention, the invention provides a low-precision ambient air temperature measuring device for use with avionics applications capable of functioning with imprecise air temperature data, the device embodying the method of the invention and including both a thermal sensor fixed in contact with an inner surface of the skin of an aircraft and a means for detecting a temperature signal generated by the thermal sensor.

According to one aspect of the invention, the device of the invention includes a layer of material thermally coupling the thermal sensor to the inner skin surface. Preferably, the thermal coupling material is a layer of thermally conductive material, for example, a thermally conductive bonding agent fixing the thermal sensor in intimate thermal contact with the inner skin surface.

According to another aspect of the invention, the thermal sensor of the device is a thermal sensor generally chosen from the class of thermal sensors known as thermistors.

According to yet another aspect of the invention, the invention includes a protective cover installed over the thermal sensor. Preferably the protective cover includes a surface, such as a rim, lip or flange, that contacts the inner skin surface in an area surrounding and adjacent to the thermal sensor's position, so that the cover and skin surface together essentially encompass and enclose the thermal sensor. The cover thereby protects the thermal sensor from damage, while protecting it also from effects of contact with the interior atmosphere of the aircraft. According to one aspect of the invention, the cover is at least in part formed of a thermally insulating material, such as ceramic or plastic.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

The present invention is a unique ambient air temperature determining method and device that allows ambient air temperature determination for use in onboard avionics systems requiring lower precision data, without piercing the airframe. The method of the invention provides for mounting a temperature sensor in intimate contact with the internal surface of the airframe skin and measuring the airframe skin temperature to determine ambient air temperature.

Figure 1:
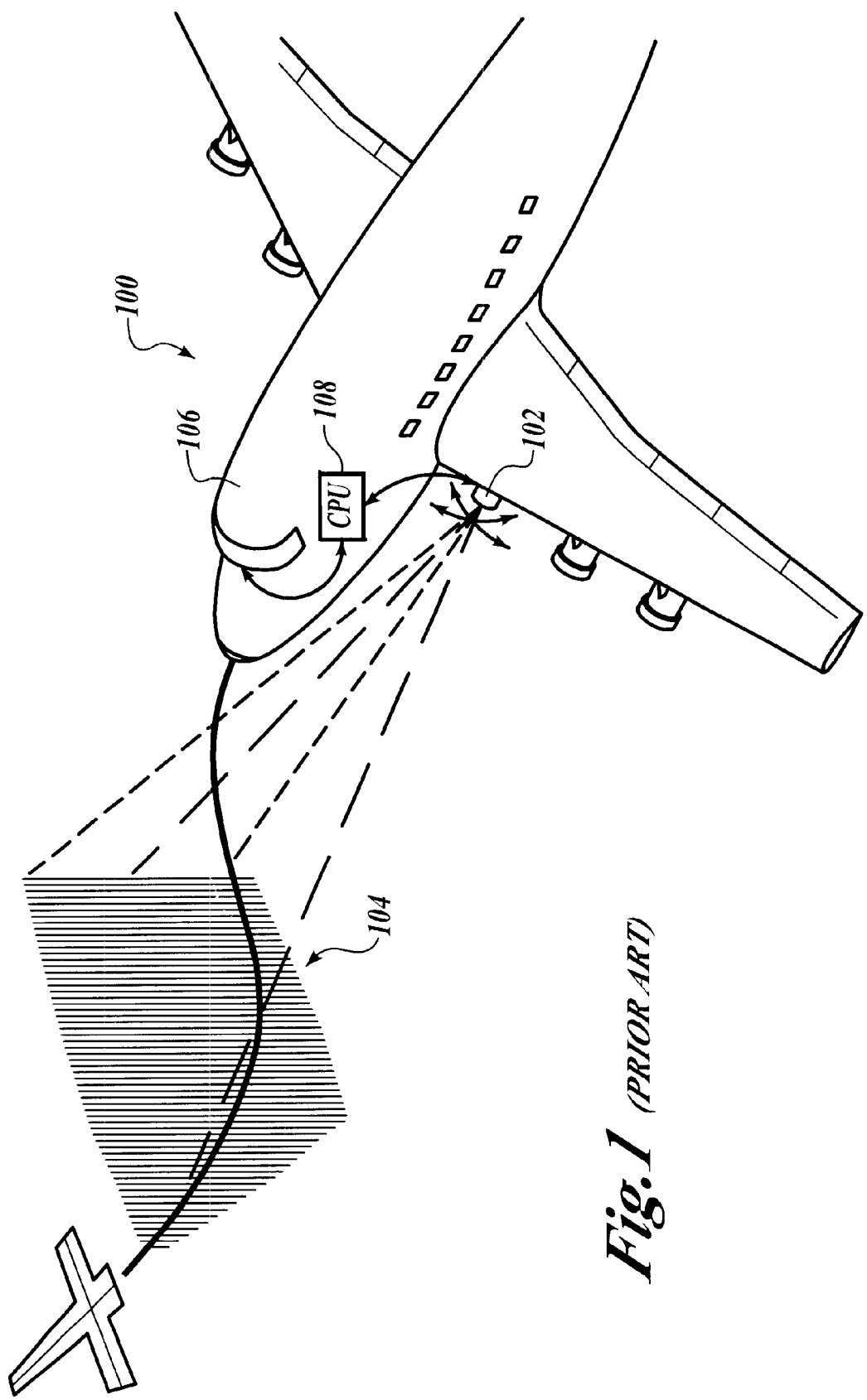
FIG. 1 illustrates one example of the conventional means of determining ambient air temperature using externally-mounted or externally-extended thermal probes.
Figure 2A:
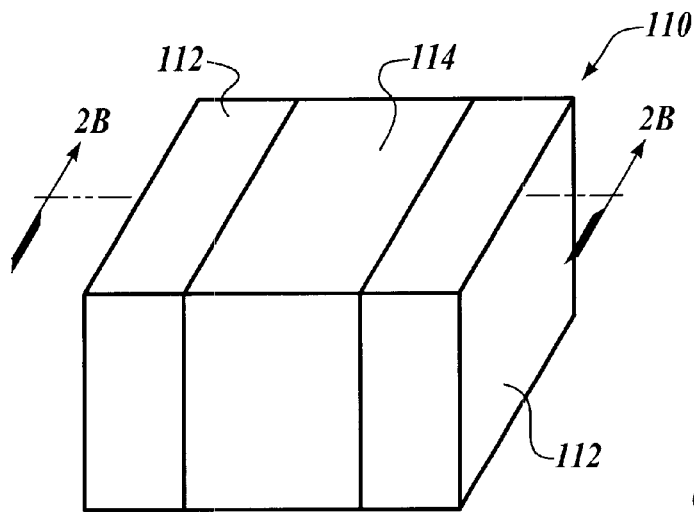
FIGS. 2A, 2B and 2C illustrate examples of known thermistor-type temperature measurement devices.
Figure 2B:
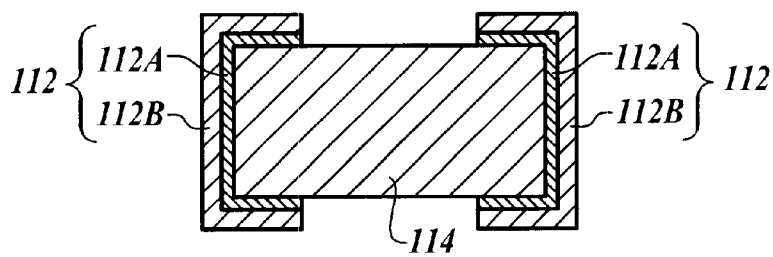
Figure 2C:
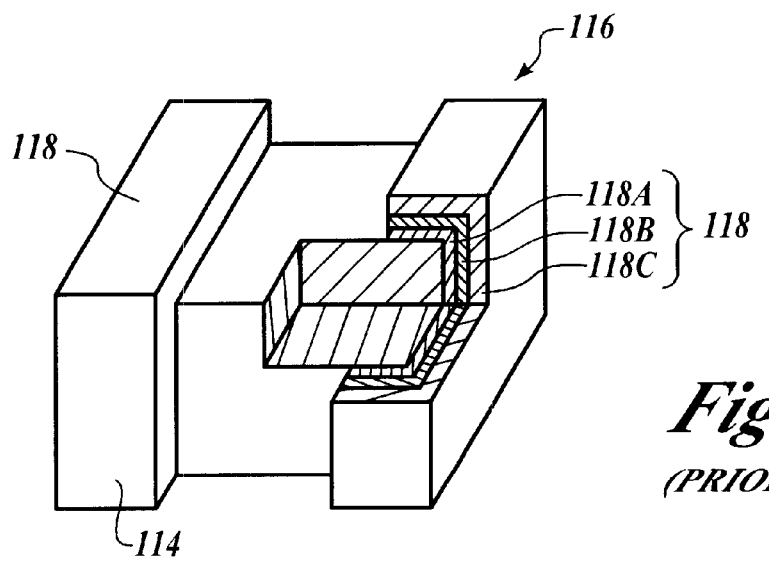
Figure 3:
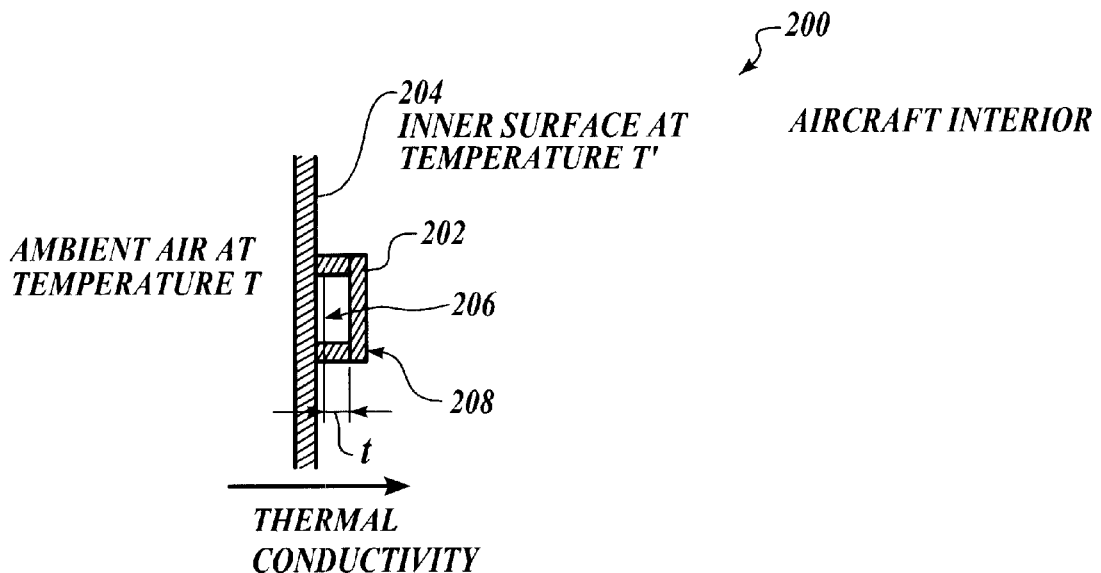
FIG. 3 illustrates one preferred embodiment of the invention, wherein a temperature sensor is fixed in intimate contact with an internal surface of the skin of the aircraft of FIG. 1.

FIG. 3 illustrates one preferred embodiment of the invention, wherein the structure and method of the invention 200 are disclosed as a temperature 202 is placed in intimate contact with an internal surface 204 of the airframe skin, or "fuselage," or an aircraft 106 (shown in FIG. 1). Aircraft 106 is surrounded by ambient air having a measurable temperature T, the approximate value of which is of interest. In general, the skin heating effects of flight experienced by ultralight aircraft, gliders, sailplanes, and slower single-engine piston aircraft are minimal and the skin temperature is directly related to the outside, or "ambient," air temperature. Airframes are generally metallic in nature, usually formed of aluminum alloy, which tend to have high coefficient of thermal conductivity. Thus, changes in the ambient air temperature are reflected in skin temperature and are transmitted quickly form the outer surface of fulelsage 204 to its inner surface, as illustrated by the arrow. Therefore, a measurement of the temperature of the inner surface of fulselage 204 provides a temperature value T' which is an essentially directly related to the current value T of the ambient air temperature. Thus, placemanet of temperature sensor 202 is intimate thermal contact with an internal surface of fuselage 204 provides the related temperature value T'.

Such intimate thermal contact is preferably provided by one of the well-known and generally commercially available thermally conductive adhesives 206. For example, U.S. Pat. No. 5,490,895, entitled Ceramic Aluminum Laminate and Thermally Conductive Adhesive Therefor, issued to Wang, et al on Feb. 13, 1996, the complete disclosure of which is incorporated herein by reference, describes silicone-based bonding agents having good thermal conductivity characteristics. U.S. Pat. No. 5,490,895 also describes bonding agents that do not contain silicones and yet possesses good thermal conductivity characteristics. Such thermally conductive bonding agents include, for example, a polymer adhesive Master Bond EP21TDCAOHT, a product of Master Bond, Inc., of Hackensack, N.J., that is stated to generally contain 60% fused alumina. U.S. Pat. No. 5,490,895 also discloses a thermally conductive epoxy that is contains above mentioned Master Bond EP21TDCAOHT in combination with Eccobond 45 sold by Emerson and Cuming, Inc. of New Jersey, and a catalyst to form a thermally conductive adhesive bonding material capable of withstanding repeated stresses occurring through thermal cycling in temperatures from −60 degrees centigrade to +125 degrees centigrade and both vibration and humidity.

In another example, U.S. Pat. No. 4,791,076, entitled Graphite Fiber Reinforced Silica Matrix Composite, issued to Leggett, et al on Dec. 13, 1988, the complete disclosure of which is incorporated herein by reference, discloses a graphite fiber reinforced silica matrix composite formed of graphite fibers in a silica matrix containing silica, boron phosphate and beta-spodumene modified with a minor amount of an alkaline earth metal oxide, having an extremely low, nearly zero, coefficient of thermal expansion coupled with the moderate thermal conductivity and low density which makes the adhesive suitable for providing intimate thermal contact between thermal sensor 202 and the inner surface of fuselage 204. Still another suitable thermally conductive adhesive is disclosed by Adams, et al in U.S. Pat. No. 5,026,748, entitled Thermally Conductive Adhesive, issued Jun. 25, 1991, the complete disclosure of which is incorporated herein by reference, in which adhesive resins are filled with carbon fibers that exhibit high thermal conductivity values.

Thermally conductive adhesive layer 206 is optionally provided in a form commonly referred to as a "pre-form." A pre-form is a mat spun of thermally conductive fibers. For example, U.S. Pat. No. 4,861,653, entitled Pitch Carbon Fibers and Batts, issued to Parrish on Aug. 29, 1989, the complete disclosure of which is incorporated herein by reference, describes such mats formed of carbon fibers as particularly useful as reinforcement in polymer matrix composites and for the enhancement of the thermal conductivity thereof and discloses such a mat. U.S. Pat. No. 4,032,607 entitled Process for Producing Self-Bonded Webs of Non-Woven Carbon Fibers, issued to Schulz on Jun. 28, 1977, the complete disclosure of which is incorporated herein by reference, discloses a process for producing webs of non-woven carbon fibers. Other thermally conductive adhesives, both independently and in pre-forms, are similarly contemplated by the invention and considered within the scope of the claims thereto.

Preferably, adhesive layer 206 also provides mechanical attachment of sensor 202 to the inner surface of fuselage 204. However, other forms of mechanical attachment are similarly contemplated by the invention and considered within the scope of the claims thereto. For example, a structural cover 208 is placed over the body of sensor 202 and bonded to the inner surface of fuselage 204 to fix sensor 202 in contact with the surface of fuselage 204. For example, the depth of cover 208 is fitted very close to or essentially the same as the thickness "t" of sensor 202. Alternatively, cover 208 is formed with an integral resilient compression member, such as a spring material formed as a slightly convex or angled surface toward sensor 202 to apply pressure thereto when cover 208 is installed over sensor 202. The resilient compression member (not shown) alternatively is a separate spring or pad of resiliently deformable material, such as rubber or silicone, installed between cover 208 and sensor 202 to hold sensor 202 against the inner surface of fuselage 204. In combination with one of the non-adhesive mechanical attachments, a thermally conductive compound, such as a commercially available thermally conductive oil or grease, is provided between the sensing surface of sensor 202 and fuselage 204 to enhance thermal transfer.

In an embodiment of the invention wherein sensor 202 is fixed to fuselage 204 with thermally conductive adhesive layer 206, cover 208 is optionally installed over sensor 202 and bonded or otherwise fixed to fuselage 204. According to such an embodiment, cover acts as a thermal shield to protect sensor 202 from influence by the interior atmosphere of aircraft 106. Accordingly, cover 208 is preferably formed of an insulating material, such as a filled fiberglass resin or molded plastic having insulating properties. Such a configuration causes sensor 202 to be generally more responsive than an uncovered configuration to the thermal energy conducted through fuselage 204.

As an installation technique, in an embodiment wherein sensor 202 is fixed to fuselage 204 with thermally conductive adhesive layer 206, a resilient member as described above is optionally permanently installed between sensor 202 and cover 208 to provide pressure to force the sensing surface of sensor 202 against fuselage 204 during cure of adhesive layer 206. Accordingly, both sensor 202 and cover 208 are installed in parallel, rather than in separate operations, thereby saving installation costs.

Temperature sensor 202 is any suitable device providing a signal representative of temperature. However, according to preferred embodiments of the invention, sensor 202 is preferably any of a well known class of temperature sensors generally identified as "thermistors." Such temperature sensing devices are described in detail in above incorporated U.S. Pat. No. 5,952,911 and are generally commercially available from several domestic and foreign manufacturers at low cost relative to conventional aircraft-use thermal probes. Temperature sensor 202 is mounted such that a sensing surface thereof is in intimate contact with the inner surface of fuselage 204, as described above.

Figure 4:
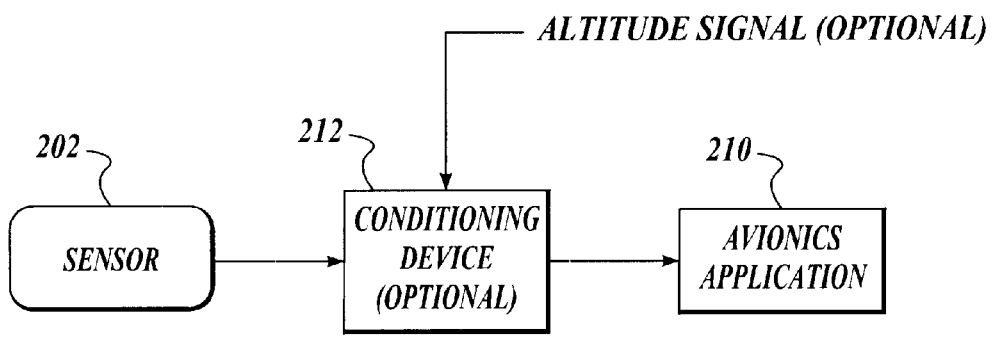
FIG. 4 illustrates a temperature sensor electrically coupled to provide a signal representative of temperature to a using avionics application.

As illustrated in FIG. 4, sensor 202 is electrically coupled in practice to a using application such that a signal representative of temperature is available to the avionics application 210. If the avionics application is operated by onboard CPU 108, the signal is coupled thereto. As described herein, the temperature signal output by sensor 202 is essentially directly related to ambient air temperature. However, the temperature value T' detected by sensor 202 is generally expected to be different from the ambient air temperature T, due primarily to effects of exposure to the atmosphere inside the aircraft. While thermal insulation provided by optional cover 208 is expected to limit this influence, conditioning of the temperature signal is optionally provided to reduce the differential between the actual temperature value T and the detected value T'. If required by the application or otherwise desired, conditioning of the temperature signal is provided by an optional conditioning unit 212. Such conditioning devices are well-known per se, and signal conditioning is provided in any of several forms. For example, signal conditioning adds a constant offset to the value T'. Such an offset is, for example, based on an average of the minimum and maximum altitudes flown by the aircraft, or is based on the typical altitude at which the application is utilized.

In another example, signal conditioning adds an offset to the value T' based on a table of constant offset values as a function of altitude, whereby signal conditioning device 212 is coupled to receive a signal representative of aircraft altitude. More complex signal conditioning includes one or more algebraic curves describing an offset as a direct function of altitude, wherein the offset is essentially constantly computed as a function of altitude. Other signal processing functions are also contemplated by the invention and considered within the scope of the claims thereto.

While the preferred embodiment of the invention has been illustrated and described, it will be appreciated that various changes can be made therein without departing from the spirit and scope of the invention.

What is claimed is:

1. A method for obtaining a low precision measurement of the ambient air temperature external to an aircraft's airframe without puncturing said airframe, said airframe being of a material having a high coefficient of thermal conductivity to allow the temperature of the interior surface of the airframe to be an approximation of the temperature of the outer surface of the airframe and said aircraft being a slow moving aircraft wherein skin heating effects are minimized, said method comprising the steps of:

affixing a thermal sensor in intimate contact with the interior surface of the aircraft's airframe; and detecting the electrical signal from said thermal sensor to provide an approximate reading of the temperature external to the aircraft.

2. The method of claim 1 wherein affixing a thermal sensor in intimate contact with the interior surface of the aircraft's airframe further comprises affixing a thermal sensor in intimate contact with the interior surface of the airframe of a slow moving aircraft selected from the group of slow moving aircraft consisting of: ultralight aircraft, gliders, sailplanes, and single-engine piston aircraft.

3. The method of claim 2 wherein the affixing a thermal sensor in intimate contact with the interior surface of the airframe of a slow moving aircraft selected from the group of slow moving aircraft consisting of ultralight aircraft, gliders, sailplanes, and single-engine piston aircraft, further comprises affixing a thermal sensor in intimate contact with the interior surface of an airframe formed of a material selected from the group of materials consisting of: aluminum and an aluminum alloy.

4. A method for obtaining a low precision measurement of the ambient air temperature external to an aircraft's airframe without puncturing said airframe, said airframe being of a material having a high coefficient of thermal conductivity in a range typical of one of an aluminum and an aluminum alloy to allow the temperature of the interior surface of the airframe to be an approximation of the temperature of the outer surface of the airframe and said aircraft being a slow moving aircraft of a type known as ultralight aircraft, gliders, sailplanes, and single-engine piston aircraft wherein skin heating effects are minimized, said method comprising the steps of:

affixing a thermal sensor in intimate contact with the interior surface of the aircraft's airframe, and detecting the electrical signal from said thermal sensor to provide an approximate reading of the temperature external to the aircraft.

* * * * *